United States Patent
Zhang et al.

(10) Patent No.: US 12,146,063 B2
(45) Date of Patent: Nov. 19, 2024

(54) THERMAL BARRIER COATING AND PREPARATION METHOD THEREOF

(71) Applicants: EAST CHINA UNIVERSITY OF SCIENCE AND TECHNOLOGY, Shanghai (CN); SHANGHAI JIAO TONG UNIVERSITY, Shanghai (CN); CHINA UNITED GAS TURBINE TECHNOLOGY CO., LTD., Shanghai (CN)

(72) Inventors: Xiancheng Zhang, Shanghai (CN); Xiaofeng Zhao, Shanghai (CN); Yali Yu, Shanghai (CN); Shantung Tu, Shanghai (CN); Dingwu Zhang, Shanghai (CN); Xiaobo Wang, Shanghai (CN); Junmiao Shi, Shanghai (CN); Weize Wang, Shanghai (CN)

(73) Assignees: EAST CHINA UNIVERSITY OF SCIENCE AND TECHNOLOGY, Shanghai (CN); SHANGHAI JIAO TONG UNIVERSITY, Shanghai (CN); CHINA UNITED GAS TURBINE TECHNOLOGY CO., LTD, Shanghai (CN)

( * ) Notice: Subject to any disclaimer, the term of this patent is extended or adjusted under 35 U.S.C. 154(b) by 0 days.

(21) Appl. No.: 18/286,457

(22) PCT Filed: Mar. 31, 2023

(86) PCT No.: PCT/CN2023/085478
§ 371 (c)(1),
(2) Date: Oct. 11, 2023

(87) PCT Pub. No.: WO2023/186094
PCT Pub. Date: Oct. 5, 2023

(65) Prior Publication Data
US 2024/0191082 A1      Jun. 13, 2024

(30) Foreign Application Priority Data

Apr. 2, 2022   (CN) .......................... 202210349568.9

(51) Int. Cl.
*C09D 1/00*      (2006.01)
*C23C 4/02*      (2006.01)
(Continued)

(52) U.S. Cl.
CPC .................. *C09D 1/00* (2013.01); *C23C 4/02* (2013.01); *C23C 4/06* (2013.01); *C23C 4/11* (2016.01); *C23C 4/134* (2016.01)

(58) Field of Classification Search
CPC ....................................................... C09D 1/00
(Continued)

(56) References Cited

U.S. PATENT DOCUMENTS

2015/0233256 A1   8/2015   Anand et al.

FOREIGN PATENT DOCUMENTS

| CN | 106588042 A | 4/2017 |
| CN | 109161837 A | 1/2019 |

(Continued)

OTHER PUBLICATIONS

Machine_English_translation_CN_113388801_A; Chen et. al.; Thermal barrier coating with composite double-ceramic-layer structure and preparation method thereof; Sep. 14, 2021; EPO; whole document (Year: 2024).*

(Continued)

*Primary Examiner* — Tahseen Khan
(74) *Attorney, Agent, or Firm* — Bay State IP, LLC

(57) ABSTRACT

Provided are a thermal barrier coating and a preparation method thereof, which belong to the field of coating technology. The thermal barrier coating has a double-layer coating structure, and includes an intermediate layer (Continued)

attached to a surface of a metal bonding layer, and a top layer, wherein the intermediate layer is formed by atmospheric plasma spraying YSZ porous microspheres, and the top layer is formed by atmospheric plasma spraying Yb—Gd codoped YSZ porous microspheres; the intermediate layer is in contact with the surface of the metal bonding layer, and the top layer is directly exposed to a high-temperature gas environment.

9 Claims, 6 Drawing Sheets

(51) Int. Cl.
  *C23C 4/06* (2016.01)
  *C23C 4/11* (2016.01)
  *C23C 4/134* (2016.01)
(58) Field of Classification Search
  USPC .................................................. 428/213
  See application file for complete search history.

(56) References Cited

FOREIGN PATENT DOCUMENTS

| CN | 113388801 A | * | 9/2021 |
| CN | 113930705 A | | 1/2022 |
| CN | 114574798 A | | 6/2022 |

OTHER PUBLICATIONS

Zhou et. al; Fast synthesis of novel micron porous particles of Gd, Yb and Y-stabilized zirconia to prepare TBCs with low thermal conductivity; Nov. 9, 2020; Material Chemistry and Physics 259 (2021) 124018; whole document (Year: 2024).*
Shuiliang Zhou et al. "Fast Synthesis of novel micron particles of Gd, Yb and Y-stabilized zirconia to prepare TBCs with low thermal conductivity" Material Chemistry and Physics, No. 259, Nov. 9, 2022, pp. 1-8.
International Search Report, China National Intellectual Property Administration, May 27, 2023.
First Office Action, The State Intellectual Property Office of People's Republic of China, Oct. 17, 2022.

* cited by examiner

THERMAL BARRIER COATING AND PREPARATION METHOD THEREOF

CROSS REFERENCE TO RELATED APPLICATION

The present application is a national stage application of International Patent Application No. PCT/CN2023/085478, filed on Mar. 31, 2023, which claims priority to Chinese Patent Application No. 202210349568.9, entitled "Structural design and preparation method of high-strain-tolerance sintering-resistance thermal barrier coating", and filed with the China National Intellectual Property Administration on Apr. 2, 2022. The disclosure of the two applications is incorporated by references herein in their entireties as part of the present application.

TECHNICAL FIELD

The present disclosure relates to the field of coating technology, in particular to a thermal barrier coating and a preparation method thereof.

BACKGROUND ART

Thermal barrier coating usually refers to a coating system used in aviation engines, ground gas turbine blades, and other hot areas, which could block direct contact between metal components and hot air flow, and play a role in reducing the temperature of metal components, protecting metal components from corrosion and oxidation by high-temperature airflow, and improving the efficiency and service life of heat engines. The existing thermal barrier coating systems allow forming a temperature gradient ranging from 100° C. to 300° C. on the outer surface of alloy components, and when combined with advanced air cooling systems, a safe operation of high-temperature alloy components in environments above their melting point (1300° C.) could be ensured. However, during long-term high-temperature service, the thermal and mechanical properties of the ceramic layer are degraded at a certain degree, which results in decreased thermal protection ability, and cracking and even peeling off of coatings, seriously threatening the safety and stability of the equipment.

SUMMARY

An object of the present disclosure is to provide a thermal barrier coating and a preparation method thereof. The thermal barrier coating according to the present disclosure has low thermal conductivity, excellent sintering resistance, and long service life.

In order to achieve the above object, the present disclosure provides the following technical solutions:

Provided is a thermal barrier coating, including an intermediate layer attached to a surface of a metal bonding layer, and a top layer, wherein the intermediate layer is formed by atmospheric plasma spraying YSZ ($Y_2O_3$-stabilized $Zro_2$) porous microspheres, and the top layer is formed by atmospheric plasma spraying Yb—Gd codoped YSZ porous microspheres; and the intermediate layer is in contact with the surface of the metal bonding layer, and the top layer is directly exposed to a high-temperature gas environment.

In some embodiments, the intermediate layer has a thickness of 50-100 μm; and the top layer has a thickness of 100-300 μm.

In some embodiments, a mass content of $Y_2O_3$ in the YSZ porous microspheres is in a range of 6-8%.

In some embodiments, a molar ratio of Yb, Gd, and YSZ in the Yb—Gd codoped YSZ porous microspheres is in a range of (1-2):(1-2):3, and a mass content of $Y_2O_3$ in the YSZ is in a range of 6-8%.

In some embodiments, the YSZ porous microspheres and the Yb—Gd codoped YSZ porous microspheres each independently have a spherical diameter of 50-100 μm; the YSZ porous microspheres and the Yb—Gd codoped YSZ porous microspheres each have a hierarchical porous structure, with a spongy circular pore in a size of 0.1-10 μm at a center of the microspheres, the spongy circular pore gradually transitioning towards a surface of the microspheres to a radiating dactylopore in a size of 10-40 μm; and the YSZ porous microspheres have a porosity of 40-60%, and the Yb—Gd codoped YSZ porous microspheres have a porosity of 40-60%.

In some embodiments, the Yb—Gd codoped YSZ porous microspheres are prepared by a process including the steps of mixing a Yb—Gd codoped YSZ powder, polyethersulfone, and N-methylpyrrolidone, to obtain an electrospraying solution; adding the electrospraying solution into an electrospraying syringe, and performing electrostatic spraying to a receiving tank that has been filled with water, to obtain microsphere green bodies in the receiving tank; and drying the microsphere green bodies, and sintering, to obtain the Yb—Gd codoped YSZ porous microspheres.

In some embodiments, the YSZ porous microspheres are prepared by a process including the steps of mixing a YSZ powder, polyethersulfone, and N-methylpyrrolidone, to obtain an electrospraying solution; adding the electrospraying solution into an electrospraying syringe, and performing electrostatic spraying to a receiving tank that has been filed with water, to obtain microsphere green bodies in the receiving tank; and drying the microsphere green bodies, and sintering, to obtain the YSZ porous microspheres.

The present disclosure further provides a method for preparing the thermal barrier coating as described in above technical solutions, including the steps of conducting first atmospheric plasma spraying of the YSZ porous microspheres on the surface of the metal bonding layer, to form the intermediate layer; and conducting second atmospheric plasma spraying of the Yb—Gd codoped YSZ porous microspheres on a surface of the intermediate layer, to form the top layer, thereby obtaining the thermal barrier coating.

In some embodiments, the first and second atmospheric plasma sprayings each are independently performed under conditions as follows: a temperature of a substrate being 200-400° C.; a distance between a spray gun and the substrate being 100-200 mm; a movement speed of the spray gun being 300-1000 mm/s; a powder feeding rate being 10-70 g/min; a powder-carrying gas flow being 0.5-1.2 L/min; and a voltage being 100-180 V; a spraying current being 200-250 A; an Ar flow rate being 40-120 L/min; and an $H_2$ flow rate being 15-45 L/min.

In some embodiments, the method further includes, before conducting the first atmospheric plasma spraying of the YSZ porous microspheres, sandblasting the surface of the metal bonding layer.

The present disclosure provides a thermal barrier coating, including an intermediate layer attached to a surface of a metal bonding layer, and a top layer, wherein the intermediate layer is formed by atmospheric plasma spraying YSZ porous microspheres, and the top layer is formed by atmospheric plasma spraying Yb—Gd codoped YSZ porous microspheres; and the intermediate layer is in contact with the surface of the metal bonding layer, and the top layer is directly exposed to a high-temperature gas environment.

In the present disclosure, Yb—Gd codoped YSZ porous microspheres are used to form the top layer, which has low thermal conductivity, reduces the thermal conductivity of the thermal barrier coating, and improves the service life of the thermal barrier coating. In addition, the porous microspheres according to the present disclosure have lower thermal conductivity compared with hollow microspheres, which could obstruct the transfer of heat flow from the surface to the interior of the microspheres, resulting in reduced melting degree of the microspheres in the plasma flame flow. The unmelted microsphere structures are retained in the coating to form a loose porous area within the coating (a higher sintering temperature for the porous microspheres results in a higher retention degree of the unmelted microsphere structures in the plasma flame flow). During the sintering of the thermal barrier coating, the shrinkage rate of the loose porous area is higher than that of the dense area, resulting in the formation of new large pores that are difficult to heal at the interface between the two areas, thus imparting high sintering resistance to the thermal barrier coating.

In addition, during the use of the thermal barrier coating according to the present disclosure, the formation of large pores is balanced with the healing of cracks and micropores during the sintering, such that high porosity of the thermal barrier coating is still maintained after sintering, thereby greatly reducing the transmittance of the thermal barrier coating. At high temperature, low transmittance could effectively reduce infrared transmission heat transfer, and the thermal barrier coating therefore exhibits infrared radiation resistance. The newly formed large pores have an orientation consistent with the direction of the coating surface and perpendicular to the transmission direction of heat flow. Therefore, the newly formed large pores could effectively suppress the passage of heat flow through the coating, reduce the connectivity between layers, and enable the thermal barrier coating to still have low thermal conductivity after long-term sintering, resulting in a long service life of the thermal barrier coating.

The crushing behavior of the porous microspheres adopted in the present disclosure conforms to the out-of-plane compression model of the honeycomb structure, and consumes more crushing energy during the crushing than the hollow-structure microspheres. Therefore, unmelted microspheres retained in the loose porous area could improve the service life of the thermal barrier coating through two mechanisms. On the one hand, loose porous structures could consume strain energy in the coating through deformation and fragmentation of internal structure, thereby reducing the strain energy release rate of the coating under plane stress and driving energy for crack initiation and growth. On the other hand, the loose porous area near the interface between the ceramic layer and the thermally grown oxide layer could interact with cracks, release the stress field, promote crack deflection, and inhibit crack growth from becoming a dangerous crack that may cause coating cracking, thereby imparting higher working temperature and higher strain tolerance to the thermal barrier coating.

DETAILED DESCRIPTION OF THE EMBODIMENTS

Figure 1A:
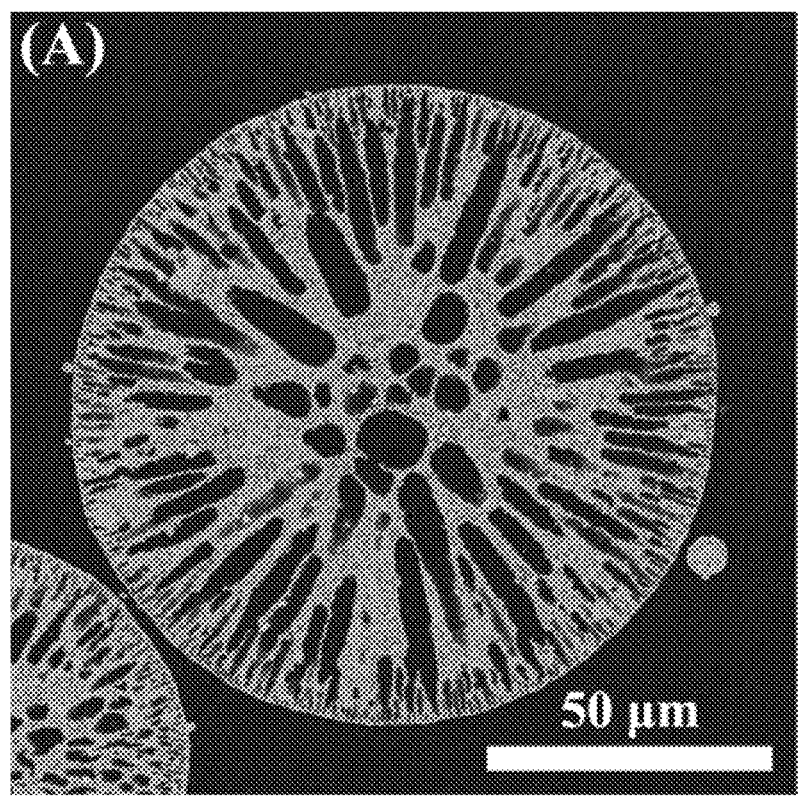
FIG. 1A and FIG. 1B show cross-sectional scanning electron microscope (SEM) images of the YSZ porous microspheres used in Example 1.

The present disclosure provides a thermal barrier coating, including an intermediate layer attached to a surface of a metal bonding layer, and a top layer, wherein the intermediate layer is formed by atmospheric plasma spraying YSZ porous microspheres, and the top layer is formed by atmospheric plasma spraying Yb—Gd codoped YSZ porous microspheres; and the intermediate layer is in contact with the surface of the metal bonding layer, and the top layer is directly exposed to a high-temperature gas environment.

In the present disclosure, there is no special requirement for the metal bonding layer, and any well-known metal bonding layer in the art may be used. In some embodiments of the present disclosure, the metal bonding layer is NiCoCrAlY In the present disclosure, there is no special requirement for the thickness of the metal bonding layer, and thickness well-known in the art is acceptable. In some embodiments of the present disclosure, the metal bonding layer is attached to a surface of a substrate.

The thermal barrier coating according to the present disclosure includes an intermediate layer attached to the surface of the metal bonding layer.

In some embodiments of the present disclosure, the intermediate layer has a thickness of 50-100 μm, and preferably 60-90 μm. In the present disclosure, the intermediate layer is formed by atmospheric plasma spraying YSZ porous microspheres. In the present disclosure, YSZ refers to $Y_2O_3$-stabilized $ZrO_2$, which is a common knowledge in the art. In some embodiments of the present disclosure, a mass content of $Y_2O_3$ in the YSZ porous microspheres is in a range of 6-8%, and preferably 7%. In some embodiments of the present disclosure, the YSZ porous microspheres have a spherical diameter of 50-100 μm, and preferably 60-90 μm. In some embodiments of the present disclosure, the YSZ porous microspheres have a hierarchical porous structure. In some embodiments, there is a spongy circular pore in a size of 0.1-10 μm at a center of the microspheres. In some embodiments, the spongy circular pore gradually transitions towards a surface of the microspheres to a radiating dactylopore. In some embodiments, the dactylopore is in a size of 10-40 μm. In some embodiments, a porosity of the YSZ porous microspheres is in a range of 40-60%.

In some embodiments of the present disclosure, the YSZ porous microspheres are prepared by a process including the following steps: mixing a YSZ powder, polyethersulfone, and N-methylpyrrolidone, to obtain an electrospraying solution; adding the electrospraying solution into an electrospraying syringe, and performing electrostatic spraying to a receiving tank that has been filled with water, to obtain microsphere green bodies in the receiving tank; and drying the microsphere green bodies, and sintering, to obtain the YSZ porous microspheres.

In the present disclosure, unless otherwise specified, all the raw materials used are well-known commercial goods in the art.

In some embodiments of the present disclosure, a YSZ powder, polyethersulfone, and N-methylpyrrolidone are mixed, to obtain an electrospraying solution. In some embodiments of the present disclosure, a mass ratio of the YSZ powder, polyethersulfone, and N-methylpyrrolidone is 3:1:6. In some embodiments of the present disclosure, the mixing is carried out in an oil bath while mechanical stirring. In some embodiments, the oil bath has a temperature of 50° C. In some embodiments, the mechanical stirring is performed for 24-48 hours. In some embodiments, the mechanical stirring is performed at a rotational speed of 200-400 r/min.

In some embodiments of the present disclosure, after the electrospraying solution is obtained, the electrospraying solution is added to an electrospraying syringe; and the electrostatic spraying is performed into a receiving tank that has been filed with water, to obtain microsphere green bodies in the receiving tank. In some embodiments of the disclosure, the electrostatic spraying is performed at a power supply voltage of 10-20 kV.

In some embodiments of the present disclosure, after obtaining the microsphere green bodies, the microsphere green bodies are dried and then sintered, to obtain the YSZ porous microspheres. In some embodiments of the present disclosure, the drying is performed at room temperature. In some embodiments, the drying is performed for 24-72 hours. In some embodiments of the present disclosure, the sintering is carried out in an air atmosphere. In some embodiments, the sintering is performed at a temperature of 1100-1400° C. In some embodiments, the sintering is performed for 1-10 hours.

The thermal barrier coating according to the present disclosure includes a top layer attached to the surface of the intermediate layer. In the present disclosure, the top layer is formed by atmospheric plasma spraying Yb—Gd codoped YSZ porous microspheres. In some embodiments, the top layer has a thickness of 100-300 µm, and preferably 150-250 µm. In the present disclosure, Yb—Gd codoped YSZ porous microspheres are used to form the top layer, which has a lower intrinsic thermal conductivity to prevent heat from transferring to the interior, thereby improving the service life of the thermal barrier coating.

In some embodiments of the present disclosure, a molar ratio of Yb, Gd, and YSZ in the Yb—Gd codoped YSZ porous microspheres is in a range of (1-2):(1-2):3. In some embodiments, a mass content of $Y_2O_3$ in the YSZ is in a range of 6-8%, and preferably 7%. In some embodiments of the present disclosure, the Yb—Gd codoped YSZ porous microspheres have a spherical diameter of 50-100 µm, and preferably 60-90 µm. In some embodiments of the present disclosure, the Yb—Gd codoped YSZ porous microspheres have a hierarchical porous structure. In some embodiments, the spongy circular pore is in a size of 0.1-10 µms. In some embodiments, the spongy circular pore gradually transitions towards a surface of the microspheres to a radiating dactylopore. In some embodiments, the radiating dactylopore is in a size of 10-40 µm. In some embodiments of the present disclosure, a porosity of the Yb—Gd codoped YSZ porous microspheres is in a range of 40-60%.

In some embodiments of the present disclosure, the process for preparing the Yb—Gd codoped YSZ porous microspheres is the same as the process for preparing the YSZ porous microspheres, except that: the YSZ powder used is replaced with a Yb—Gd codoped YSZ powder; and the sintering is performed at a temperature of 1200-1600° C. for 1-10 hours, which will not be repeated here.

In some embodiments of the present disclosure, the Yb—Gd codoped YSZ powder is prepared by a process including the following steps: ball milling and mixing $Yb_2O_3$, $Gd_2O_3$, and YSZ in a molar ratio of Yb, Gd, and YSZ being (1-2):(1-2):3 through high-energy ball milling under conditions of a grinding solvent of isopropanol or ethanol, a ball milling time of 24-48 hours, and a ball milling rate of 1000-4000 r/min; after the ball milling, drying a resulting slurry for 24 hours, and grinding and sieving the dried slurry with a 100-mesh sieve, to obtain the Yb—Gd codoped YSZ powder.

The porous microspheres according to the present disclosure have lower thermal conductivity compared with hollow microspheres, which could hinder the transfer of heat flow from the surface to the interior of the microspheres, resulting in reduced melting degree of the microspheres in the plasma flame flow. The unmelted microsphere structures are retained in the coating to form a loose porous area within the coating (a higher sintering temperature for the porous microspheres results in a higher retention degree of unmelted microsphere structure in the plasma flame flow). During the sintering of the thermal barrier coating, the shrinkage rate of the loose porous area is higher than that of the dense area, resulting in the formation of new large pores that are difficult to heal at the interface between the two areas, thus imparting high sintering resistance to the thermal barrier coating.

In addition, during the use of the thermal barrier coating according to the present disclosure, the formation of large pores is balanced with the healing of cracks and micropores during the sintering, such that high porosity of the thermal barrier coating is still maintained after sintering, thereby greatly reducing the transmittance of the thermal barrier coating. At high temperatures, low transmittance could effectively reduce infrared transmission heat transfer, and the thermal barrier coating therefore exhibits infrared radiation resistance. The newly formed large pores have an orientation consistent with the direction of the coating surface and perpendicular to the transmission direction of heat flow. Therefore, the newly formed large pores could effectively suppress the passage of heat flow through the coating, reduce the connectivity between layers, and enable the thermal barrier coating to still have low thermal conductivity after long-term sintering, resulting in a long service life of the thermal barrier coating.

The crushing behavior of the porous microspheres adopted in the present disclosure conforms to the out-of-plane compression model of the honeycomb structure, and consumes more crushing energy during the crushing than the hollow-structure microspheres. Therefore, unmelted microspheres retained in the loose porous area could improve the service life of the thermal barrier coating through two mechanisms. On the one hand, loose porous structures could consume strain energy in coatings through deformation and fragmentation of internal structural, thereby reducing the strain energy release rate of the coating under plane stress and driving energy for crack initiation and growth. On the other hand, the porous area near the interface between the ceramic layer and the thermally grown oxide layer could interact with cracks, release the stress field, promote crack deflection, inhibit crack growth from becoming a dangerous crack that may cause coating cracking, thereby imparting higher working temperature and higher strain tolerance to the thermal barrier coating.

The present disclosure further provides a method for preparing the thermal barrier coating as described in above technical solutions, including the steps of conducting first atmospheric plasma spraying of the YSZ porous microspheres on the surface of the metal bonding layer, to form the intermediate layer; and conducting second atmospheric plasma spraying of the Yb—Gd codoped YSZ porous microspheres on a surface of the intermediate layer, to form the top layer, thereby obtaining the thermal barrier coating.

In some embodiments of the present disclosure, the metal bonding layer is attached to the surface of the substrate. In some embodiments of the present disclosure, the substrate is subjected to roughening treatment, to obtain a roughened substrate; and a metal bonding layer is prepared on a surface of the roughened substrate.

In the present disclosure, there is no special requirement for the type of substrate, and those skilled in the art may choose according to actual needs. In some embodiments of the present disclosure, before the roughening treatment, the substrate is subjected to degreasing treatment. In the present disclosure, there is no special requirement for the process of degreasing treatment, and a degreasing process well-known in the art may be used. In some embodiments of the present disclosure, the roughening treatment includes sandblasting the substrate with $Al_2O_3$ particles in a particle size of 60 to 120 mesh. In the present disclosure, roughening treatment on the substrate is to improve the adhesion between the substrate and the metal bonding layer. In some embodiments of the present disclosure, the metal bonding layer is NiCoCrAlY In the present disclosure, there is no special requirement for the preparation process of the metal bonding layer, and a preparation process of the metal bonding layer well-known in the art may be used, such as atmospheric plasma spraying or supersonic flame spraying. In the present disclosure, a metal bonding layer is set to alleviate the thermal expansion mismatch between the ceramic layer and the alloy substrate, thereby increasing their compatibility.

In some embodiments of the present disclosure, after obtaining the metal bonding layer, sandblasting treatment is performed on the surface of the metal bonding layer, and the first atmospheric plasma spraying of YSZ porous microspheres is then performed to form the intermediate layer.

In the present disclosure, there is no special requirement for the sandblasting treatment process, as long as a surface roughness Ra of the metal bonding layer after sandblasting of 1-15 μm is ensured.

In some embodiments of the present disclosure, the first atmospheric plasma spraying is performed under conditions including: a temperature of a substrate being 200-400° C., preferably 250-350° C.; a distance between a spray gun and the substrate being 100-200 mm, preferably 120-180 mm; a movement speed of the spray gun being 300-1000 mm/s, preferably 400-800 mm/s; a powder feeding rate being 10-70 g/min, preferably 20-60 g/min; a powder-carrying gas flow being 0.5-1.2 L/min, preferably 0.6-1.0 L/min; a voltage being 100-180 V, preferably 120-160 V; a spraying current being 200-250 A, and preferably 210-240 A; an Ar flow rate being 40-120 L/min, and preferably 50-100 L/min; an $H_2$ flow rate being 15-45 L/min, preferably 20-40 L/min.

In the present disclosure, after the intermediate layer is formed, the second atmosphere plasma spraying of Yb—Gd codoped YSZ porous microspheres are performed on the surface of the intermediate layer, forming the top layer, thereby obtaining the thermal barrier coating.

In some embodiments of the present disclosure, the second atmospheric plasma spraying is performed under conditions including: a substrate temperature being 200-400° C., preferably 250-350° C.; a distance between a spray gun and the substrate being 100-200 mm, preferably 120-180 mm; a movement speed of the spray gun being 300-1000 mm/s, preferably 400-800 mm/s; a powder feeding rate being 10-70 g/min, preferably 20-60 g/min; a powder-carrying gas flow being 0.5-1.2 L/min, preferably 0.6-1.0 L/min; a voltage being 100-180 V, preferably 120-160 V; a spraying current being 200-250 A, preferably 210-240 A; an Ar flow rate being 40-120 L/min, preferably 50-100 L/min; an $H_2$ flow rate being 15-45 L/min, preferably 20-40 L/min.

The thermal barrier coating and its preparation method according to the present disclosure are described below in details in conjunction with examples, but these examples could not be understood as limiting the scope of the present disclosure.

A Method for Preparing YSZ Porous Microspheres Used in Example 1 was Performed According to the Following Procedures:

(1) Preparation of electrospraying solution: YSZ powder (8 wt % $Y_2O_3$-stabilized $ZrO_2$) was mixed with polyethersulfone and N-methylpyrrolidone in a mass ratio of 3:1:6, and they were fully mixed evenly through heating in an oil bath while mechanical stirring, in which, the temperature of the oil bath was 50° C., and the stirring was performed for 24 h with a rotation rate of a stirring rod being 200 r/min, to eliminate physical agglomeration between nano powders, obtaining a uniform powder suspension. After being fully stirred, the resulting system was cooled to room temperature, obtaining an electrospray solution of electrospray microspheres.

(2) Electrostatic spraying: the obtained electrospraying solution was added into an electrospraying syringe; a power supply voltage was adjusted to 10 kV; a receiving tank was filled with water; and electrostatic spraying was performed, obtaining microsphere green bodies in the receiving tank.

(3) Sintering: the microsphere green bodies were filtered out by using a Buchner funnel, and then dried at room temperature for 24 hours, and sintered at high temperature (1200° C.) in an air atmosphere for 2 hours. After sieving, YSZ porous microspheres with a particle size of 100 μm were obtained, composition of which was 8 wt % $Y_2O_3$-stabilized $ZrO_2$.

A method for preparing Yb—Gd codoped YSZ porous microspheres used in Example 1 was performed according to the following procedures:

(1) Powder preparation: $Yb_2O_3$, $Gd_2O_3$, and YSZ (a molar ratio of Yb, Gd, and YSZ being 2:2:3) were ball milled and mixed by using a high-energy ball milling method for 24 hours at a ball milling rate of 1000 r/min (in which, isopropanol was used as a grinding solvent). After the ball milling, a resulting slurry was dried for 24 hours, ground, and sieved with a 100-mesh sieve, obtaining a mixed powder which passed through the 100-mesh sieve.

(2) Preparation of electrospraying solution: the mixed powder obtained in step (1) was mixed with polyethersulfone and N-methylpyrrolidone in a mass ratio of 3:1:6, and they were fully mixed evenly through heating in an oil bath while mechanical stirring, in which, the temperature of the oil bath was 50° C., and the stirring was performed for 24 h with a rotation rate of a stirring rod being 200 r/min, to eliminate the physical agglomeration between nano powders, obtaining a uniform powder suspension. After being fully mixed, the resulting system was cooled to room temperature, obtaining the electrospraying solution of electrospraying microspheres.

(3) Electrostatic spraying: the obtained electrospraying solution was added into an electrospraying syringe; a power supply voltage was adjusted to 10 kV; a receiving tank was filled with water; and electrostatic spraying was performed, obtaining microsphere green bodies in the receiving tank.

(4) Sintering: the microsphere green bodies were filtered out by using a Buchner funnel, dried at room temperature for 24 hours, and sintered at high temperature (1200° C.) in an air atmosphere for 1 hour. After sieving, Yb—Gd codoped YSZ porous microspheres with a particle size of 70 μm were obtained, in which a molar ratio of Yb:Gd:YSZ being 2:2:3.

A Method for Preparing YSZ Porous Microspheres Used in Example 2 was Performed According to the Following Procedures:

(1) Preparation of electrospraying solution: YSZ powder (6 wt % $Y_2O_3$-stabilized $ZrO_2$) was mixed with polyethersulfone and N-methylpyrrolidone in a mass ratio of 3:1:6, and they were fully mixed evenly through heating in an oil bath while mechanical stirring, in which, the temperature of the oil bath was 50° C., and the stirring was performed for 36 h with a rotation rate of a stirring rod being 300 r/min, to eliminate physical agglomeration between nano powders, obtaining a uniform powder suspension. After being fully stirred, the resulting system was cooled to room temperature, obtaining an electrospray solution of electrospray microspheres.

(2) Electrostatic spraying: the obtained electrospraying solution was added into an electrospraying syringe; a power supply voltage was adjusted to 15 kV; a receiving tank was filled with water; and electrostatic spraying was performed, obtaining microsphere green bodies in the receiving tank.

(3) Sintering: the microsphere green bodies were filtered out by using a Buchner funnel, and then dried at room temperature for 36 hours, and sintered at high temperature (1300° C.) in an air atmosphere for 5 hours. After sieving, YSZ porous microspheres with a particle size of 70 μm were obtained, composition of which was 6 wt % $Y_2O_3$-stabilized $ZrO_2$.

A Method for Preparing Yb—Gd Codoped YSZ Porous Microspheres Used in Example 2 was Performed According to the Following Procedures:

(1) Powder preparation: $Yb_2O_3$, $Gd_2O_3$, and YSZ (a molar ratio of Yb, Gd, and YSZ being 1:2:3) were ball milled and mixed by using a high-energy ball milling method for 36 hours at a ball milling rate of 2000 r/min (in which, isopropanol was used as a grinding solvent). After ball milling, a resulting slurry was dried for 24 hours, ground, and sieved with a 100-mesh sieve, obtaining a mixed powder which passed through the 100-mesh sieve.

(2) Preparation of electrospraying solution: the mixed powder obtained in step (1) was mixed with polyethersulfone and N-methylpyrrolidone in a mass ratio of 3:1:6, and they were fully mixed evenly through heating in an oil bath and while mechanical stirring, in which, the temperature of the oil bath was 50° C., and the stirring was performed for 36 h with a rotation rate of a stirring rod being 300 r/min, to eliminate the physical agglomeration between nanopowders, obtaining a uniform powder suspension. After being fully mixed, the resulting system was cooled to room temperature, obtaining the electrospraying solution of electrospraying microspheres.

(3) Electrostatic spraying: the obtained electrospraying solution was added into an electrospraying syringe; a power supply voltage was adjusted to 15 kV; a receiving tank was filled with water; and electrostatic spraying was performed, obtaining microsphere green bodies in the receiving tank.

(4) Sintering: the microsphere green bodies were filtered out by using a Buchner funnel, dried at room temperature for 48 hours, and sintered at high temperature (1400° C.) in an air atmosphere for 2 hour, obtaining Yb—Gd codoped YSZ porous microspheres with a particle size of 50 μm, in which a molar ratio of Yb:Gd:YSZ being 1:2:3.

A method for preparing YSZ porous microspheres used in Example 3 was performed according to the following procedures:

(1) Preparation of electrospraying solution: YSZ powder was mixed with polyethersulfone and N-methylpyrrolidone in a mass ratio of 3:1:6, and they were fully mixed evenly through heating in an oil bath while mechanical stirring, in which, the temperature of the oil bath was 50° C., and the stirring was performed for 48 h with a rotation rate of a stirring rod being 400 r/min, to eliminate physical agglomeration between nano powders, obtaining a uniform powder suspension. After being fully stirred, the resulting system was cooled to room temperature, obtaining an electrospray solution of electrospray microspheres.

(2) Electrostatic spraying: the obtained electrospraying solution was added into an electrospraying syringe; a power supply voltage was adjusted to 20 kV; a receiving tank was filled with water; and electrostatic spraying was performed, obtaining microsphere green bodies in the receiving tank.

(3) Sintering: the microsphere green bodies were filtered out by using a Buchner funnel, and then dried at room temperature for 72 hours, and sintered at high temperature (1400° C.) in an air atmosphere for 10 hours. After sieving, YSZ porous microspheres with a particle size of 50 μm were obtained, composition of which was 7 wt % $Y_2O_3$-stabilized $ZrO_2$.

A Method for Preparing Yb—Gd Codoped YSZ Porous Microspheres Used in Example 3 was Performed According to the Following Procedures:

(1) Powder preparation: $Yb_2O_3$, $Gd_2O_3$, and YSZ (a molar ratio of Yb, Gd, and YSZ being 1:1:3) were ball milled and mixed by using a high-energy ball milling method for 48 hours at a ball milling rate of 4000 r/min (in which, ethanol was used as a grinding solvent). After ball milling, a resulting slurry was dried for 24 hours, ground, and sieved with a 100-mesh sieve, obtaining a mixed powder which passed through the 100-mesh sieve.

(2) Preparation of electrospraying solution: the mixed powder obtained in step (1) was mixed with polyethersulfone and N-methylpyrrolidone in a mass ratio of 3:1: 6, and they were fully mixed evenly through heating in an oil bath and while mechanical stirring, in which, the temperature of the oil bath was 50° C., and the stirring was performed for 48 h with a rotation rate of a stirring rod being 400 r/min, to eliminate the physical agglomeration between nano powders, obtaining a uniform powder suspension. After being fully mixed, the resulting system was cooled to room temperature, obtaining the electrospraying solution of electrospraying microspheres.

(3) Electrostatic spraying: the obtained electrospraying solution was added into an electrospraying syringe; a power supply voltage was adjusted to 20 kV; a receiving tank was filled with water; and electrostatic spraying was performed, obtaining microsphere green bodies in the receiving tank.

(4) Sintering: the microsphere green bodies were filtered out by using a Buchner funnel, dried at room temperature for 72 hours, and sintered at high temperature (1600° C.) in an air atmosphere for 10 hour, obtaining Yb—Gd codoped YSZ porous microspheres with a particle size of 100 μm, in which a molar ratio of Yb:Gd:YSZ being 1:1:3.

Example 1

A metal substrate was sandblasted with $Al_2O_3$ particles in a particle size of 120 mesh, obtaining a roughened metal substrate with a uniform surface roughness.

An NiCoCrAlY metal bonding layer was formed onto the roughened metal substrate through atmospheric plasma spraying technology.

The metal bonding layer was sandblasted with $Al_2O_3$ particles in a particle size of 120 mesh, resulting in a roughness of 10 μm.

A YSZ intermediate layer (8 wt % $Y_2O_3$-stabilized $ZrO_2$) with a thickness of 50 μm and a Yb—Gd codoped YSZ ceramic layer (i.e., the top layer, in which, a molar ratio of Yb:Gd:YSZ was 2:2:3) with a thickness of 100 μm were deposited in sequence on the sandblasted metal bonding layer through atmospheric plasma spraying.

Parameters for the atmospheric plasma spraying were as follows: a substrate temperature being 400° C.; a distance between a spray gun and the substrate being 100 mm; a movement speed of the spray gun being 1000 mm/s; a powder feeding rate being 10 g/min; a powder-carrying gas flow being 0.5 L/min; and a voltage being 180 V; a spraying current being 200 A; an Ar flow rate being 40 L/min; and an $H_2$ flow rate being 15 L/min.

Example 2

A metal substrate was sandblasted with $Al_2O_3$ particles in a particle size of 60 mesh, obtaining a roughened metal substrate with a uniform surface roughness.

An NiCoCrAlY metal bonding layer was formed onto the roughened metal substrate through atmospheric plasma spraying technology.

The metal bonding layer was sandblasted with $Al_2O_3$ particles in a particle size of 80 mesh, resulting in a roughness of 15 μm.

A YSZ intermediate layer (6 wt % $Y_2O_3$-stabilized $ZrO_2$) with a thickness of 50 μm and a Yb—Gd codoped YSZ ceramic layer (i.e., the top layer, in which, a molar ratio of Yb:Gd:YSZ was 1:2:3) with a thickness of 200 μm were deposited in sequence on the sandblasted bonding layer through atmospheric plasma spraying.

Parameters for the atmospheric plasma spraying were as follows: a substrate temperature being 200° C.; a distance between a spray gun and the substrate being 100 mm; a movement speed of the spray gun being 1000 mm/s; a powder feeding rate being 10 g/min; a powder-carrying gas flow being 0.5 L/min; and a voltage being 180 V; a spraying current being 200 A; an Ar flow rate being 40 L/min; and an $H_2$ flow rate being 15 L/min.

Example 3

A metal substrate was sandblasted with $Al_2O_3$ particles in a particle size of 80 mesh, obtaining a roughened metal substrate with a uniform surface roughness.

An NiCoCrAlY metal bonding layer was formed onto the roughened metal substrate through atmospheric plasma spraying technology.

The metal bonding layer was sandblasted with $Al_2O_3$ particles in a particle size of 60 mesh, resulting in a roughness of 1 μm.

A YSZ intermediate layer (7 wt % $Y_2O_3$-stabilized $ZrO_2$) with a thickness of 100 μm and a Yb—Gd codoped YSZ ceramic layer (i.e., the top layer, in which, a molar ratio of Yb:Gd:YSZ was 1:1:3) with a thickness of 150 μm were deposited in sequence on the sandblasted metal bonding layer through atmospheric plasma spraying.

Parameters for the atmospheric plasma spraying were as follows: a substrate temperature being 200° C.; a distance between a spray gun and the substrate being 100 mm; a movement speed of the spray gun being 1000 mm/s; a powder feeding rate being 10 g/min; a powder-carrying gas flow being 0.5 L/min; and a voltage being 140 V; a spraying current being 200 A; an Ar flow rate being 40 L/min; and an $H_2$ flow rate being 15 L/min.

Comparative Example 1

A metal substrate was sandblasted with $Al_2O_3$ particles in a particle size of 80 mesh, obtaining a roughened metal substrate with a uniform surface roughness.

An NiCoCrAlY metal bonding layer was formed onto the roughened metal substrate through atmospheric plasma spraying technology.

The metal bonding layer was sandblasted with $Al_2O_3$ particles in a particle size of 60 mesh, resulting in a roughness of 1 μm.

A YSZ ceramic layer (7 wt % $Y_2O_3$-stabilized $ZrO_2$, hollow microspheres in a particle size of 70 μm) with a thickness of 200 μm was deposited on the sandblasted metal bonding layer through atmospheric plasma spraying.

Parameters for the atmospheric plasma spraying were as follows: a substrate temperature being 200° C.; a distance between a spray gun and the substrate being 100 mm; a movement speed of the spray gun being 1000 mm/s; a powder feeding rate being 10 g/min; a powder-carrying gas flow being 0.5 L/min; and a voltage being 140 V; a spraying current being 200 A; an Ar flow rate being 40 L/min; and an $H_2$ flow rate being 15 L/min.

Structural Characterization and Performance Test

Figure 1B:
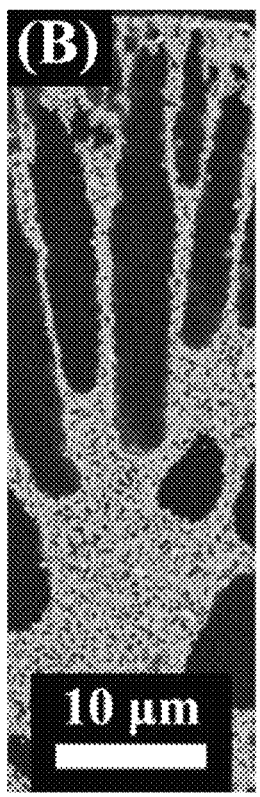

1. The cross-section of the YSZ porous microspheres used in Example 1 was observed through SEM. The results are shown in FIGS. 1A and 1B. As can be seen from FIGS. 1A and 1B, the microspheres have a hierarchical porous structure, with a spongy circular pore in a size of 0.1-10 μm at a center of the microspheres; the spongy circular pore gradually transitions towards a surface of the microspheres to a radiating oval dactylopore in a size of 10-40 μm.

Figure 2:
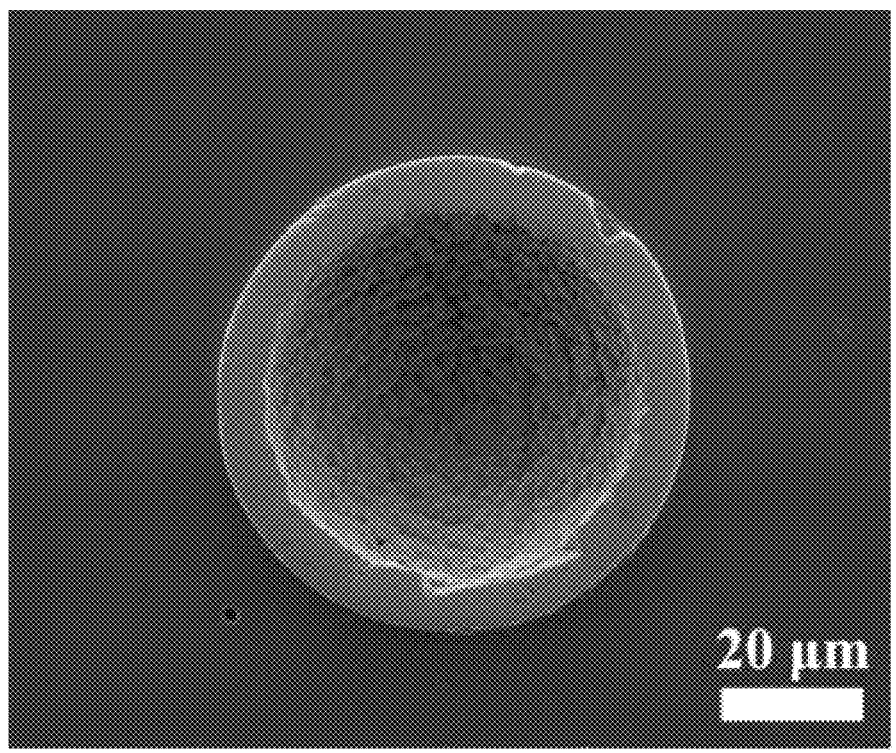
FIG. 2 shows the cross-sectional SEM image of the YSZ hollow microspheres used in Comparative Example 1.

2. The cross-section of the YSZ porous microspheres used in Comparative Example 1 was observed through SEM. The results are shown in FIG. 2. As can be seen from FIG. 2, there is a hollow structure in a single pore form, with an internal cavity and no complex porous structure.

Figure 3A:
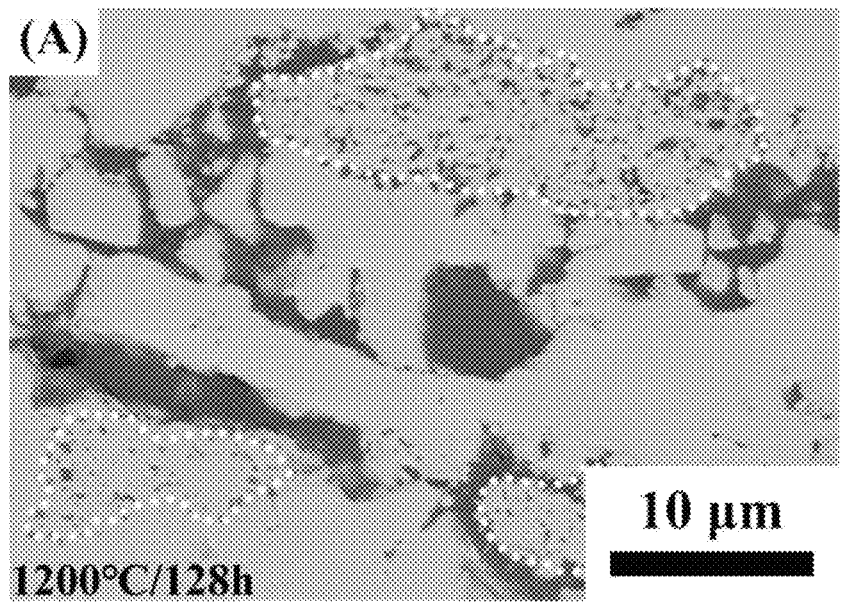
FIGS. 3A to 3F show the microstructure evolution of the top layer of the porous thermal barrier coating prepared in Example 3 after being sintered at different temperatures.
Figure 3B:
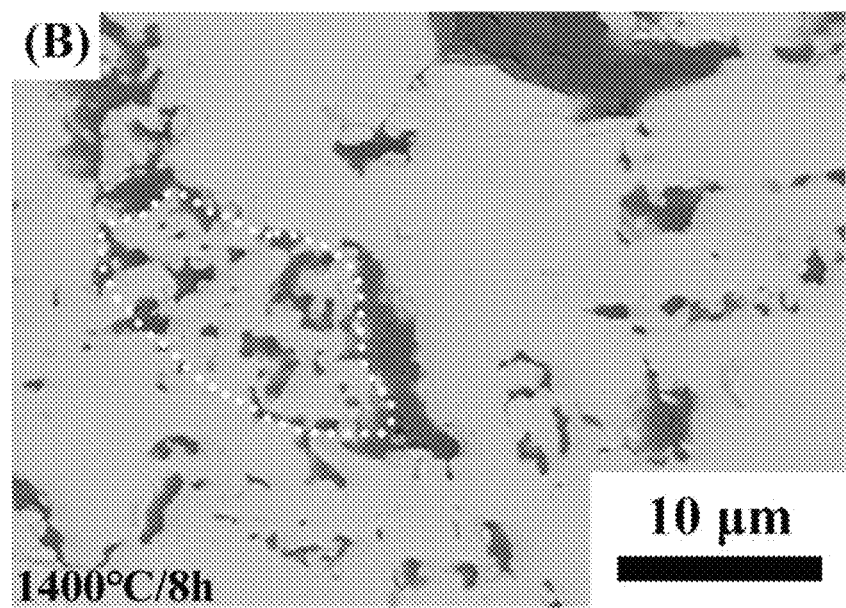
Figure 3C:
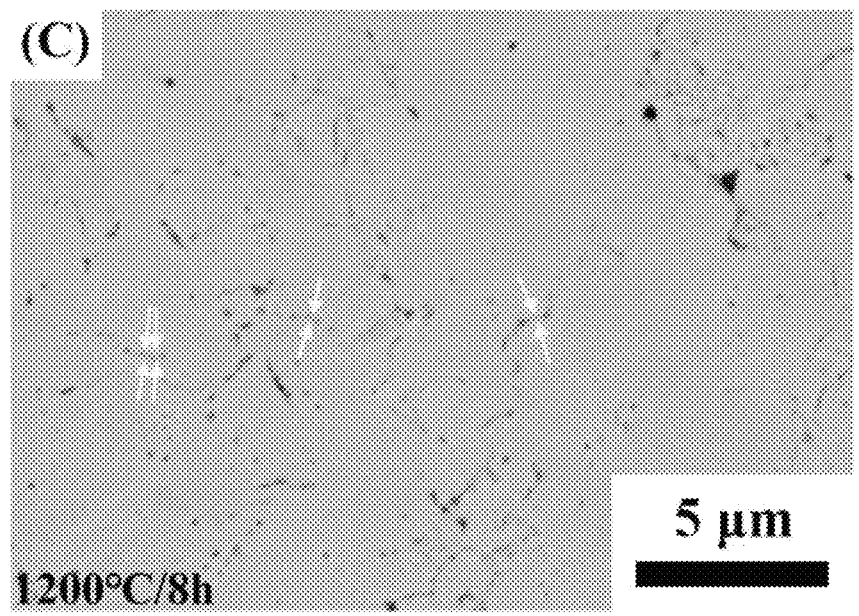
Figure 3D:
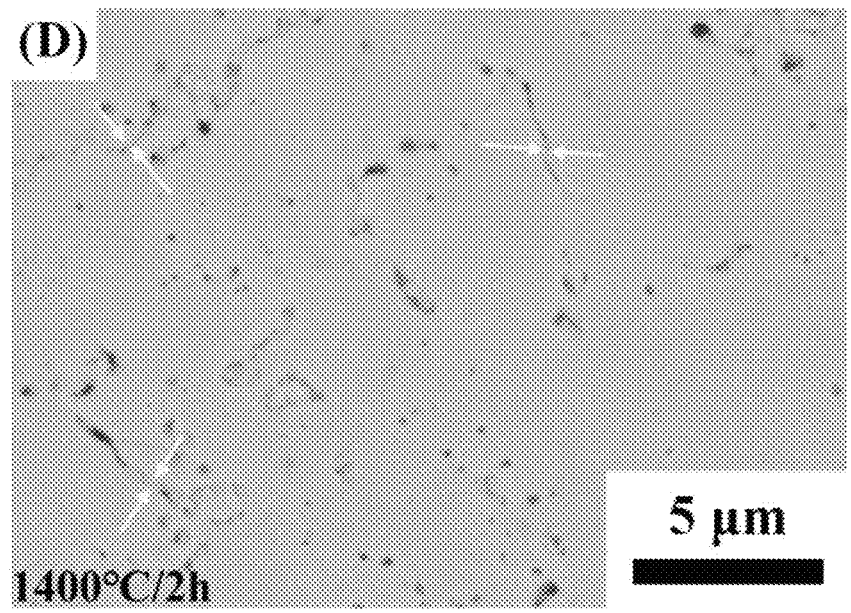
Figure 3E:
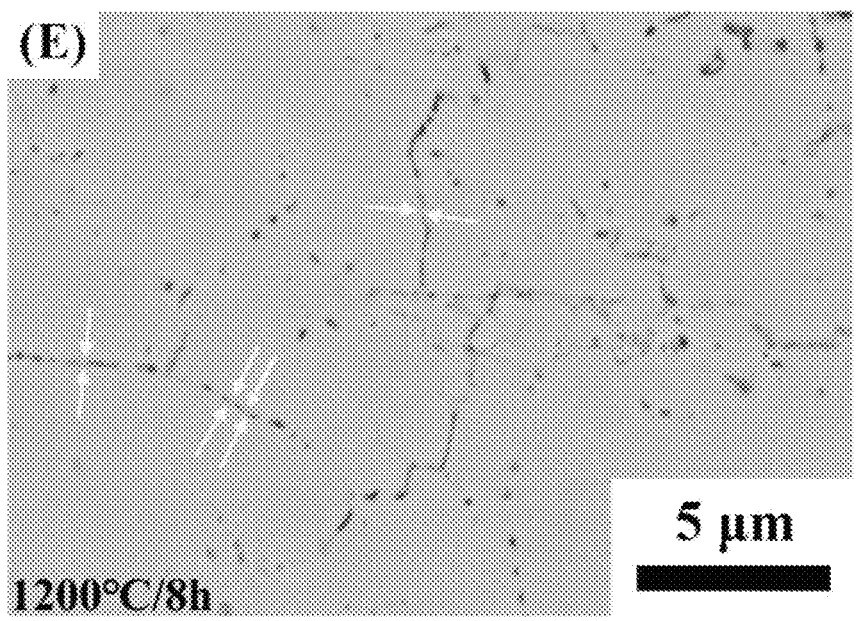
Figure 3F:
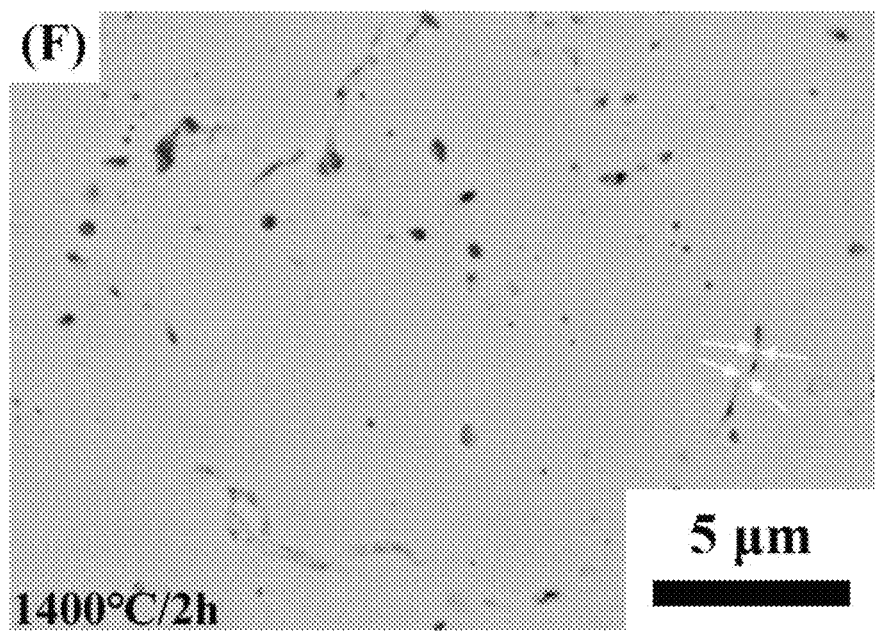

3. FIGS. 3A to 3F show the microstructure evolution of the top layer of the porous thermal barrier coating prepared in Example 3 after being sintered at different temperatures. Microstructure evolution of different areas of the coating during sintering are shown in FIGS. 3A to 3F: morphology of the loose porous areas in the coating is shown in FIG. 3A (being sintered at 1200° C. for 128 hours) and FIG. 3B (being sintered at 1400° C. for 8 hours); the morphology of the dense areas in the inventive coating is shown in FIG. 3C (being sintered at 1200° C. for 8 hours) and FIG. 3D (being sintered at 1400° C. for 2 hours); the morphology of the coating is shown in FIG. 3E (being sintered at 1200° C. for 8 hours) and FIG. 3F (being sintered at 1400° C. for 2 hours). The dashed lines in the FIGS. 3A to 3F circle porous areas after sintering, and the arrows point out the bridges that crosse microcracks after sintering. FIG. 3A and FIG. 3B clearly show the morphological changes of the porous area after sintering: after being sintered at 1200° C. for 128 hours, the densification degree in the porous areas increases, nano and submicron-sized particles disappear, micropores decrease, and the average pore size increases; after being sintered at 1400° C. for 8 hours, submicron-level pores in the porous areas completely disappear, and the pore size in the areas could reach several micrometers, and new large-sized pores appear at the interface between the original porous areas and the dense areas.

4. Performance tests were conducted on the thermal barrier coatings prepared in Examples 1-3 and Comparative example 1. The tests were performed according to the procedures as follows. The test results are shown in Table 1.

Service life test of the thermal barrier coating: The service life of the coating is characterized by a thermal cycling test. The thermal cycle experiment was conducted by using a 10 mm×10 mm thermal barrier coating sample with a metal substrate, with a single cycle period being 24 hours. In each cycle, the sample at room temperature is first placed in a muffle furnace at 1150° C. The sample in the muffle furnace was quickly heated to the furnace chamber temperature, and then maintained at the temperature for 23.5 hours. The sample was then taken out of the muffle furnace and air cooled at room temperature for 20 minutes before entering the next cycle. When more than 10% of the surface area of the sample peeled off, the tested sample was evaluated invalid and the thermal cycling experiment of this sample was terminated. To ensure the accuracy of experimental data, 20 coating samples were taken for thermal cycling experiments.

Porosity test: Image analysis method was adopted. By using open-source graphics processing software (ImageJ), images were segmented, and relevant information about pores was obtained; and the porosity of microspheres and coatings was quantitatively analyzed.

Transmittance test: The transmission spectrum of the material is measured by using a ultraviolet (UV)-visible and near-infrared spectrophotometer.

TABLE 1

Performance data of thermal barrier coatings (referred to as "the coating") in Examples 1-3 and Comparative Example 1

| | Porosity of the original coating | Porosity of the coating after being sintered at 1200° C. for 128 h | Porosity of the coating after being sintered at 1400° C. for 128 h | Transmittance | Service life of the coating |
|---|---|---|---|---|---|
| Example 1 | 20% | 17% | 16.5% | 7% | 750 h |
| Example 2 | 22% | 18.5% | 18% | 5% | 700 h |
| Example 3 | 18% | 15.1% | 14% | 7% | 600 h |
| Comparative Example 1 | 11.5% | 8.2% | 7% | 25% | 200 h |

From the above results of examples and comparative example, it can be seen that, the thermal barrier coating prepared according to the present disclosure has higher porosity and lower transmittance compared with traditional coatings, and exhibits excellent sintering resistance, and a service life three times that of traditional coatings (i.e., Comparative Example 1).

The above are only the preferred embodiments of the present disclosure. It should be pointed out that for a person of ordinary skill in the art, several improvements and embellishments could be made without departing from the principles of the present disclosure. These improvements and embellishments should also be deemed as falling within the scope of the present disclosure.

What is claimed is:

1. A thermal barrier coating, comprising an intermediate layer attached to a surface of a metal bonding layer, and a top layer, wherein
   the intermediate layer is formed by atmospheric plasma spraying YSZ porous microspheres, and the top layer is formed by atmospheric plasma spraying Yb—Gd codoped YSZ porous microspheres; and
   the intermediate layer is in contact with the surface of the metal bonding layer, and the top layer is directly exposed to a high-temperature gas environment;
   the YSZ porous microspheres and the Yb—Gd codoped YSZ porous microspheres each independently have a spherical diameter of 50-100 μm;
   the YSZ porous microspheres and the Yb—Gd codoped YSZ porous microspheres each have a hierarchical porous structure, with a spongy circular pore in a size of 0.1-10 μm at a center of microspheres, the spongy circular pore gradually transitioning towards a surface of the microspheres to a radiating dactylopore in a size of 10-40 μm; and
   the YSZ porous microspheres have a porosity of 40-60%, and the Yb—Gd codoped YSZ porous microspheres have a porosity of 40-60%.

2. The thermal barrier coating as claimed in claim 1, wherein the intermediate layer has a thickness of 50-100 μm; and the top layer has a thickness of 100-300 μm.

3. The thermal barrier coating as claimed in claim 1, wherein a mass content of $Y_2O_3$ in the YSZ porous microspheres is in a range of 6-8%.

4. The thermal barrier coating as claimed in claim 1, wherein a molar ratio of Yb, Gd, and YSZ in the Yb—Gd codoped YSZ porous microspheres is in a range of (1-2): (1-2): 3, and a mass content of $Y_2O_3$ in the YSZ is in a range of 6-8%.

5. The thermal barrier coating as claimed in claim 1, wherein the Yb—Gd codoped YSZ porous microspheres are prepared by a process comprising the steps of:
   mixing a Yb—Gd codoped YSZ powder, polyethersulfone, and N-methylpyrrolidone, to obtain an electrospraying solution;
   adding the electrospraying solution into an electrospraying syringe, and performing electrostatic spraying to a receiving tank that has been filled with water, to obtain microsphere green bodies in the receiving tank; and
   drying the microsphere green bodies, and sintering, to obtain the Yb—Gd codoped YSZ porous microspheres.

6. The thermal barrier coating as claimed in claim 1, wherein the YSZ porous microspheres are prepared by a process comprising the steps of:
   mixing a YSZ powder, polyethersulfone, and N-methylpyrrolidone, to obtain an electrospraying solution;
   adding the electrospraying solution into an electrospraying syringe, and performing electrostatic spraying to a receiving tank that has been filed with water, to obtain microsphere green bodies in the receiving tank; and
   drying the microsphere green bodies, and sintering, to obtain the YSZ porous microspheres.

7. A method for preparing the thermal barrier coating as claimed in claim 1, comprising the steps of:
   conducting first atmospheric plasma spraying of the YSZ porous microspheres on the surface of the metal bonding layer, to form the intermediate layer; and
   conducting second atmospheric plasma spraying of the Yb—Gd codoped YSZ porous microspheres on a surface of the intermediate layer, to form the top layer, thereby obtaining the thermal barrier coating.

8. The method as claimed in claim 7, wherein the first and second atmospheric plasma sprayings each are independently performed under conditions: a temperature of a substrate being 200-400° C.; a distance between a spray gun and the substrate being 100-200 mm; a movement speed of the spray gun being 300-1000 mm/s; a powder feeding rate being 10-70 g/min; a powder-carrying gas flow being 0.5-1.2 L/min; and a voltage being 100-180 V; a spraying current being 200-250 A; an Ar flow rate being 40-120 L/min; and an $H_2$ flow rate being 15-45 L/min.

9. The method as claimed in claim 7, further comprising, before conducting the first atmospheric plasma spraying of the YSZ porous microspheres, sandblasting the surface of the metal bonding layer.

\* \* \* \* \*